United States Patent
Rotman et al.

(10) Patent No.: US 7,342,533 B2
(45) Date of Patent: Mar. 11, 2008

(54) METHOD AND APPARATUS FOR OBTAINING SATELLITE TRAJECTORY DATA AT A SATELLITE POSITIONING SYSTEM RECEIVER

(75) Inventors: Boaz Efroni Rotman, Cupertino, CA (US); Charles Abraham, Los Gatos, CA (US)

(73) Assignee: Global Locate, Inc., San Jose, CA (US)

( * ) Notice: Subject to any disclaimer, the term of this patent is extended or adjusted under 35 U.S.C. 154(b) by 295 days.

(21) Appl. No.: 10/968,345

(22) Filed: Oct. 19, 2004

(65) Prior Publication Data

US 2006/0082497 A1    Apr. 20, 2006

(51) Int. Cl.
 *G01S 1/02*    (2006.01)
(52) U.S. Cl. .............................. 342/357.15; 342/357.06
(58) Field of Classification Search ........... 342/357.01, 342/357.06, 357.09, 357.15; 701/207, 213, 701/215
See application file for complete search history.

(56) References Cited

U.S. PATENT DOCUMENTS

| | | | | |
|---|---|---|---|---|
| 3,630,079 | A * | 12/1971 | Hughes et al. | ............ 73/178 R |
| 6,741,935 | B1 * | 5/2004 | Eschenbach | ................ 701/215 |
| 7,133,772 | B2 * | 11/2006 | van Diggelen | .............. 701/207 |
| 2003/0052817 | A1 * | 3/2003 | Diggelen | ............... 342/357.09 |
| 2006/0111840 | A1 * | 5/2006 | van Diggelen | .............. 701/215 |

* cited by examiner

*Primary Examiner*—Dao Phan
(74) *Attorney, Agent, or Firm*—McAndrews Held & Malloy, Ltd.

(57) ABSTRACT

Method and apparatus for locating position of a mobile receiver is described. In one embodiment, satellite measurements are obtained at the mobile receiver for a plurality of satellites in a satellite positioning system constellation. Satellite trajectory data is obtained at the mobile receiver from a server. Ephemeris data is obtained at the mobile receiver from at least one satellite of the plurality of satellites. Position is computed for the mobile receiver using the satellite measurements, the satellite trajectory data, and the ephemeris data.

23 Claims, 5 Drawing Sheets

METHOD AND APPARATUS FOR OBTAINING SATELLITE TRAJECTORY DATA AT A SATELLITE POSITIONING SYSTEM RECEIVER

BACKGROUND OF THE INVENTION

1. Field of the Invention

Embodiments of the present invention generally relate to satellite position location systems. More particularly, the invention relates to a method and apparatus for obtaining satellite trajectory data at a satellite positioning system receiver.

2. Description of the Related Art

Global Positioning System (GPS) receivers use measurements from several satellites to compute position. GPS receivers normally determine their position by computing time delays between transmission and reception of signals transmitted from satellites and received by the receiver on or near the surface of the earth. The time delays multiplied by the speed of light provide the distance from the receiver to each of the satellites that are in view of the receiver.

More specifically, each GPS signal available for commercial use utilizes a direct sequence spreading signal defined by a unique pseudo-random noise (PN) code (referred to as the coarse acquisition (C/A) code) having a 1.023 MHz spread rate. Each PN code bi-phase modulates a 1575.42 MHz carrier signal (referred to as the L1 carrier) and uniquely identifies a particular satellite. The PN code sequence length is 1023 chips, corresponding to a one millisecond time period. One cycle of 1023 chips is called a PN frame or epoch.

GPS receivers determine the time delays between transmission and reception of the signals by comparing time shifts between the received PN code signal sequence and internally generated PN signal sequences. These measured time delays are referred to as "sub-millisecond pseudoranges", since they are known modulo the 1 millisecond PN frame boundaries. By resolving the integer number of milliseconds associated with each delay to each satellite, then one has true, unambiguous, pseudoranges. A set of four pseudoranges together with a knowledge of absolute times of transmission of the GPS signals and satellite positions in relation to these absolute times is sufficient to solve for the position of the GPS receiver. The absolute times of transmission (or reception) are needed in order to determine the positions of the GPS satellites at the times of transmission and hence to compute the position of the GPS receiver.

Accordingly, each of the GPS satellites broadcasts a model of satellite orbit and clock data known as the satellite navigation message. The satellite navigation message is a 50 bit-per-second (bps) data stream that is modulo-2 added to the PN code with bit boundaries aligned with the beginning of a PN frame. There are exactly 20 PN frames per data bit period (20 milliseconds). The satellite navigation message includes satellite-positioning data, known as "ephemeris" data, which identifies the satellites and their orbits, as well as absolute time information (also referred to herein as "GPS time" or "time-of-day") associated with the satellite signal. The absolute time information is in the form of a second of the week signal, referred to as time-of-week (TOW). This absolute time signal allows the receiver to unambiguously determine a time tag for when each received signal was transmitted by each satellite.

In some GPS applications, the signal strengths of the satellite signals are so low that either the received signals cannot be processed, or the time required to process the signals is excessive. As such, to improve the signal processing, a GPS receiver may receive assistance data from a network to assist in satellite signal acquisition and/or processing. For example, the GPS receiver may be integrated within a cellular telephone and may receive the assistance data from a server using a wireless communication network. This technique of providing assistance data to a remote mobile receiver has become known as "Assisted-GPS" or A-GPS. In some A-GPS systems, the assistance data received from the network comprises ephemeris data for satellites in-view of the GPS receiver. Conventionally, the GPS receiver polls the network every 15 to 30 minutes for updated ephemeris to allow for inclusion of newly risen satellites in the navigation solution.

Presently, if the connection between the GPS receiver and the network is lost (e.g., the receiver roams out of the service area of the network or communications between the network and the receiver are blocked by obstructions), the GPS receiver cannot obtain updated ephemeris from the network. As such, the GPS receiver must wait until the network connection is re-established before obtaining updated ephemeris. As a result, the GPS receiver may not have sufficient ephemeris data to compute position during the time that the network connection is lost.

Accordingly, there exists a need in the art for a method and apparatus capable of locating position of a mobile receiver when unable to receive satellite trajectory data from a network.

SUMMARY OF THE INVENTION

Method and apparatus for locating position of a mobile receiver is described. In one embodiment, satellite measurements are obtained at the mobile receiver for a plurality of satellites in a satellite positioning system constellation. Satellite trajectory data is obtained at the mobile receiver from a server. Ephemeris data is obtained at the mobile receiver from at least one satellite of the plurality of satellites. Position is computed for the mobile receiver using the satellite measurements, the satellite trajectory data, and the ephemeris data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION

A method and apparatus for locating position of a mobile receiver in a satellite position location system is described. Those skilled in the art will appreciate that the invention may be used with various types of mobile or wireless devices that are "location-enabled," such as cellular telephones, pagers, laptop computers, personal digital assistants (PDAs), and like type wireless devices known in the art. Generally, a location-enabled mobile device is facilitated by including in the device the capability of processing satellite positioning system (SPS) satellite signals.

Figure 1:
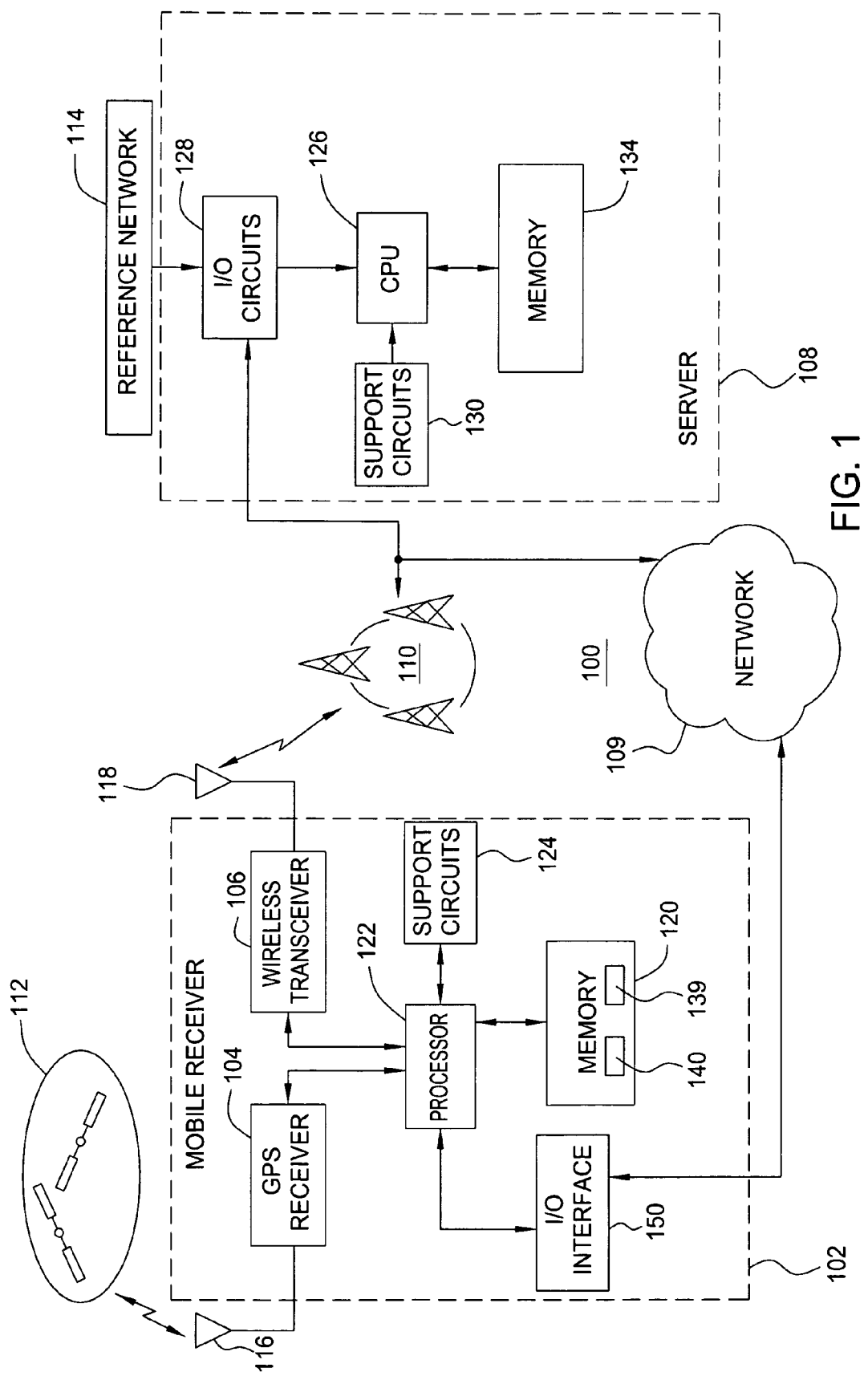
FIG. 1 is a block diagram depicting an exemplary embodiment of a position location system.

FIG. 1 is a block diagram depicting an exemplary embodiment of a position location system 100. The system 100 comprises a mobile receiver 102 in communication with a server 108 via a wireless communication network 110. For example, the server 108 may be disposed in a serving mobile location center (SMLC) of the wireless communication network 110. The wireless communication network 110 may comprise a cellular communication network having a plurality of base stations or cell sites. The mobile receiver 102 is configured to receive satellite signals from a plurality of satellites 112 in a constellation of satellites. The mobile receiver 102 processes the received signals to produce satellite measurement data (e.g., pseudoranges, Doppler measurements) with respect to the satellites 112.

The mobile receiver 102 is configured to request and receive satellite trajectory data from the server 108 (e.g., ephemeris data or other satellite orbit model). The mobile receiver 102 may receive the satellite trajectory data via the wireless communication network 110 or from a network 109, such as the Internet. Such a configuration is referred to as a mobile station based or "MS-based" mode. The mobile receiver 102 is also configured to obtain satellite navigation data directly from the satellites 112 (e.g., ephemeris data). Notably, the GPS receiver 104 may decode satellite signals to recover the satellite navigation data using a well known decoding process. Such a configuration is referred to as an "autonomous" mode.

In one embodiment of the invention, if the mobile receiver 102 is not capable of communication with the server 108 at a given moment, the mobile receiver 102 may transition from obtaining satellite trajectory data from the server 108 to obtaining ephemeris directly from the satellites 112. That is, the mobile receiver 102 may transition from MS-based mode to autonomous mode. For example, the mobile receiver 102 may update satellite trajectory data obtained from the server 108 with ephemeris obtained directly from the satellites 112 to allow for inclusion of newly risen satellites (i.e., satellites that were not in view of the mobile receiver 102 at the time the server 108 sent the satellite trajectory data and thus were not accounted for by the server 108). The mobile receiver 102 may then compute position using a combination of satellite trajectory data obtained from the server 108 and ephemeris obtained directly from the satellites 112.

In another embodiment of the invention, the mobile receiver 102 is configured to initially attempt to obtain ephemeris directly from the satellites 112 (i.e., the mobile receiver 102 is initialized in autonomous mode). If sufficient ephemeris cannot be obtained directly from the satellites 112, the mobile receiver 102 then transitions to obtaining satellite trajectory data from the server 108 (i.e., the mobile receiver 102 transitions to MS-based mode). In this manner, the mobile receiver 102 only communicates with the server 108 if sufficient satellite orbit data cannot be obtained from the satellites 112, which minimizes network traffic.

The mobile receiver 102 illustratively comprises a GPS receiver 104, a wireless transceiver 106, a processor 122, support circuits 124, an input/output (I/O) interface 150, and a memory 120. The GPS receiver 104 receives satellite signals from the satellites 112 using an antenna 116. The GPS receiver 104 may comprise a conventional A-GPS receiver. An exemplary A-GPS receiver is described in commonly-assigned U.S. Pat. No. 6,453,237, issued Sep. 17, 2002, which is incorporated by reference herein in its entirety. The wireless transceiver 106 receives wireless signals from the wireless communication network 110 via an antenna 118. The GPS receiver 104 and the wireless transceiver 106 may be controlled by the processor 122.

The processor 122 may comprise a microprocessor, instruction-set processor (e.g., a microcontroller), or like type processing element known in the art. The processor 122 is coupled to the memory 120 and the support circuits 124. The memory 120 may be random access memory, read only memory, removable storage, hard disc storage, or any combination of such memory devices. The memory 120 may be used to store satellite trajectory data 139 received from the server 108 and/or the satellites 112. Various processes and methods described herein may be implemented via software 140 stored in the memory 120 for execution by the processor 122. Alternatively, such processes and methods may be implemented using dedicated hardware, such as an application specific integrated circuit (ASIC), or a combination of hardware and software. The support circuits 124 include conventional cache, power supplies, clock circuits, data registers, I/O circuitry, and the like to facilitate operation of the mobile receiver 102. The I/O interface 150 may comprise a modem or like-type communication interface for communicating with the network 109.

Satellite navigation data, such as ephemeris for at least the satellites 112, may be collected by a network of tracking stations ("reference network 114"). The reference network 114 may include several tracking stations that collect satellite navigation data from all the satellites in the constellation, or a few tracking stations, or a single tracking station that only collects satellite navigation data for a particular region of the world. An exemplary system for collecting and distributing ephemeris is described in commonly-assigned U.S. Pat. No. 6,411,892, issued Jun. 25, 2002, which is incorporated by reference herein in its entirety. The reference network 114 may provide the collected satellite navigation data to the server 108.

The server 108 illustratively comprises an input/output (I/O) interface 128, a central processing unit (CPU) 126, support circuits 130, and a memory 134. The CPU 126 is coupled to the memory 134 and the support circuits 130. The memory 134 may be random access memory, read only memory, removable storage, hard disc storage, or any combination of such memory devices. The support circuits 130 include conventional cache, power supplies, clock circuits, data registers, I/O interfaces, and the like to facilitate operation of the server 108. The I/O interface 128 is configured to receive satellite navigation data from the reference network 114 and is configured for communication with the wireless communication network 110. In addition, the I/O interface 128 may be in communication with the network 109.

The server 108 may use the satellite navigation data from the reference network 114 to provide assistance data to the mobile receiver 102. The assistance data comprises satellite trajectory data (e.g., ephemeris, Almanac, and/or some other orbit model). Upon request, the server 108 may transmit satellite trajectory data to the mobile receiver 102 via the wireless communication network 110. Alternatively, the mobile receiver 102 may receive satellite trajectory data via the network 109. Notably, the satellite trajectory data may comprise a long term satellite trajectory model, as described in commonly-assigned U.S. Pat. No. 6,560,534, issued May 6, 2003, which is incorporated by reference entirety.

Figure 2:
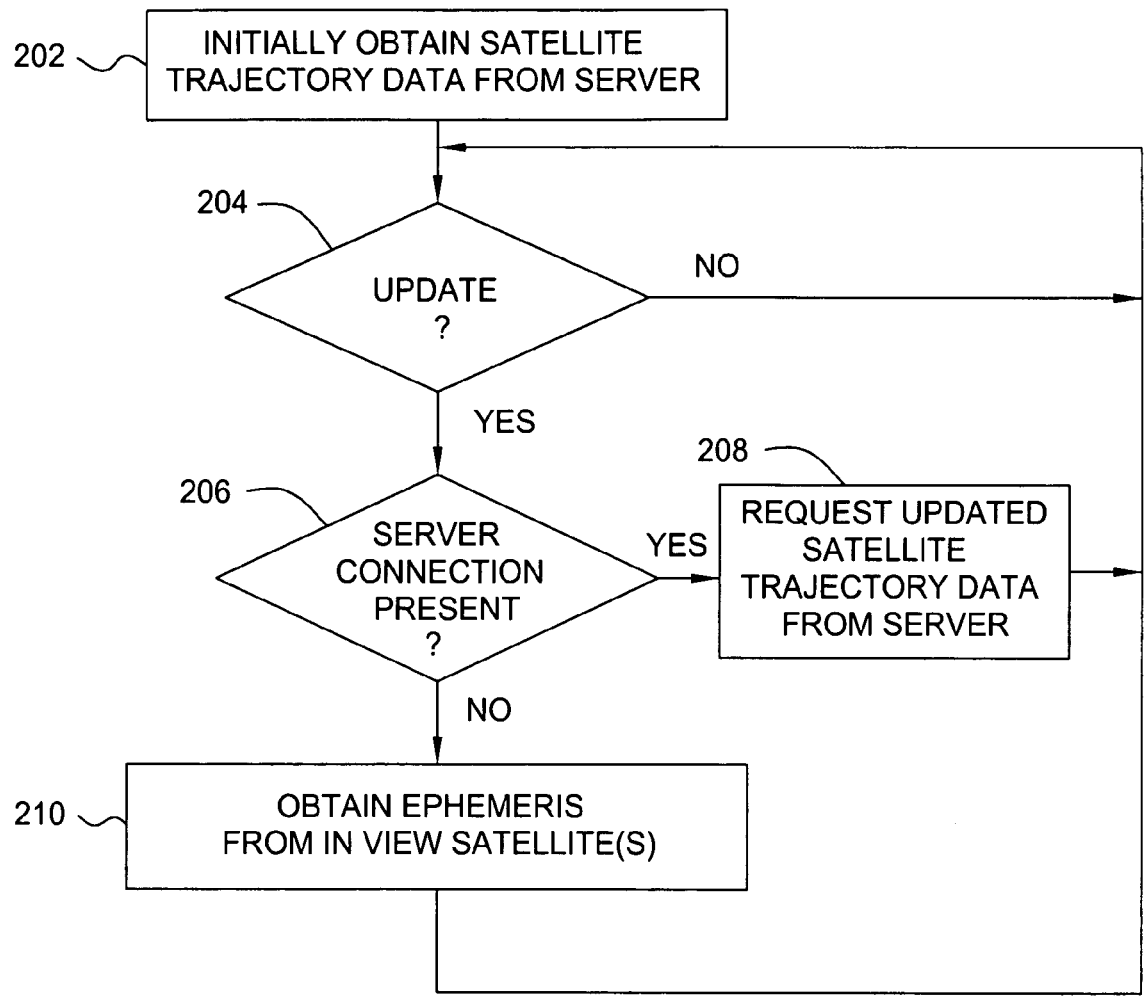
FIG. 2 is a flow diagram depicting an exemplary embodiment of a method of obtaining satellite trajectory data at a mobile receiver in accordance with the invention.

FIG. 2 is a flow diagram depicting an exemplary embodiment of a method 200 for obtaining satellite trajectory data at a mobile receiver in accordance with the invention. Aspects of the method 200 may be understood with simultaneous reference to FIG. 1. The method 200 begins at step 202, where the mobile receiver 102 initially obtains satellite trajectory data from the server 108 (e.g., the mobile receiver 102 is configured to operate in a MS based mode). The mobile receiver 102 may use the satellite trajectory data along with satellite measurement data to compute position.

At step 204, a determination is made as to whether the satellite trajectory data should be updated. The satellite trajectory data may be updated upon occurrence of various conditions. For example, the satellite trajectory data obtained at step 202 is valid for a particular period of time (e.g., broadcast ephemeris data is valid for two to four hours). The satellite trajectory data should be updated if the associated validity period has expired. In another example, the satellite trajectory data obtained at step 202 corresponds to a particular set of satellites in the constellation (e.g., satellites in-view of the mobile receiver 102 at the time the satellite trajectory data was sent by the server 108). If the mobile receiver 102 is receiving satellite signals from satellites not accounted for in the current satellite trajectory data, then the satellite trajectory data should be updated to account for the new satellites (e.g., satellites that were previously below the horizon, but are now in view). In yet another example, the satellite trajectory data may be updated periodically in accordance with a pre-defined schedule (e.g., every 15 to 30 minutes).

If the satellite trajectory data should be updated, the method 200 proceeds to step 206. Otherwise, step 204 is repeated until the satellite trajectory data should be updated. At step 206, a determination is made as to whether a connection between the mobile receiver 102 and the server 108 can be established. If so, the method 200 proceeds to step 208. Otherwise, the method 200 proceeds to step 210. At step 208, the mobile receiver 102 requests updated satellite trajectory data from the server 108. The method 200 then returns to step 204.

At step 210, the mobile receiver obtains ephemeris from one or more in-view satellites. For example, the mobile receiver 102 may decode satellite signals to obtain ephemeris data for one or more satellites. The ephemeris data may be used to update the satellite trajectory data. For example, the mobile receiver 102 may obtain ephemeris from newly risen satellites that were not in view at the time the most recent satellite trajectory data was obtained from the server 108. The mobile receiver 102 may also obtain ephemeris data for particular satellites to replace expired portions of the most recent satellite trajectory data obtained from the server 108. The mobile receiver 102 may then compute its position using a combination of ephemeris received from satellites and satellite trajectory data received from the server 108 (e.g., ephemeris data). The method 200 then returns to step 204.

In this manner, the mobile receiver 102 may continue to compute position when updated satellite orbit data is required despite a lack of connectivity to the server 108. In addition, if connectivity is lost, the mobile receiver 102 is able to utilize any valid satellite trajectory data previously obtained from the server 108 in combination with any recently obtained ephemeris data acquired directly from the satellites to compute position ("enhanced autonomous mode"). If connectivity is absent for a long enough period such that the most recently obtained satellite trajectory data from the server 108 is completely invalid, then the mobile receiver 102 must obtain all of the required ephemeris data directly from the satellites ("full autonomous mode").

Figure 3:
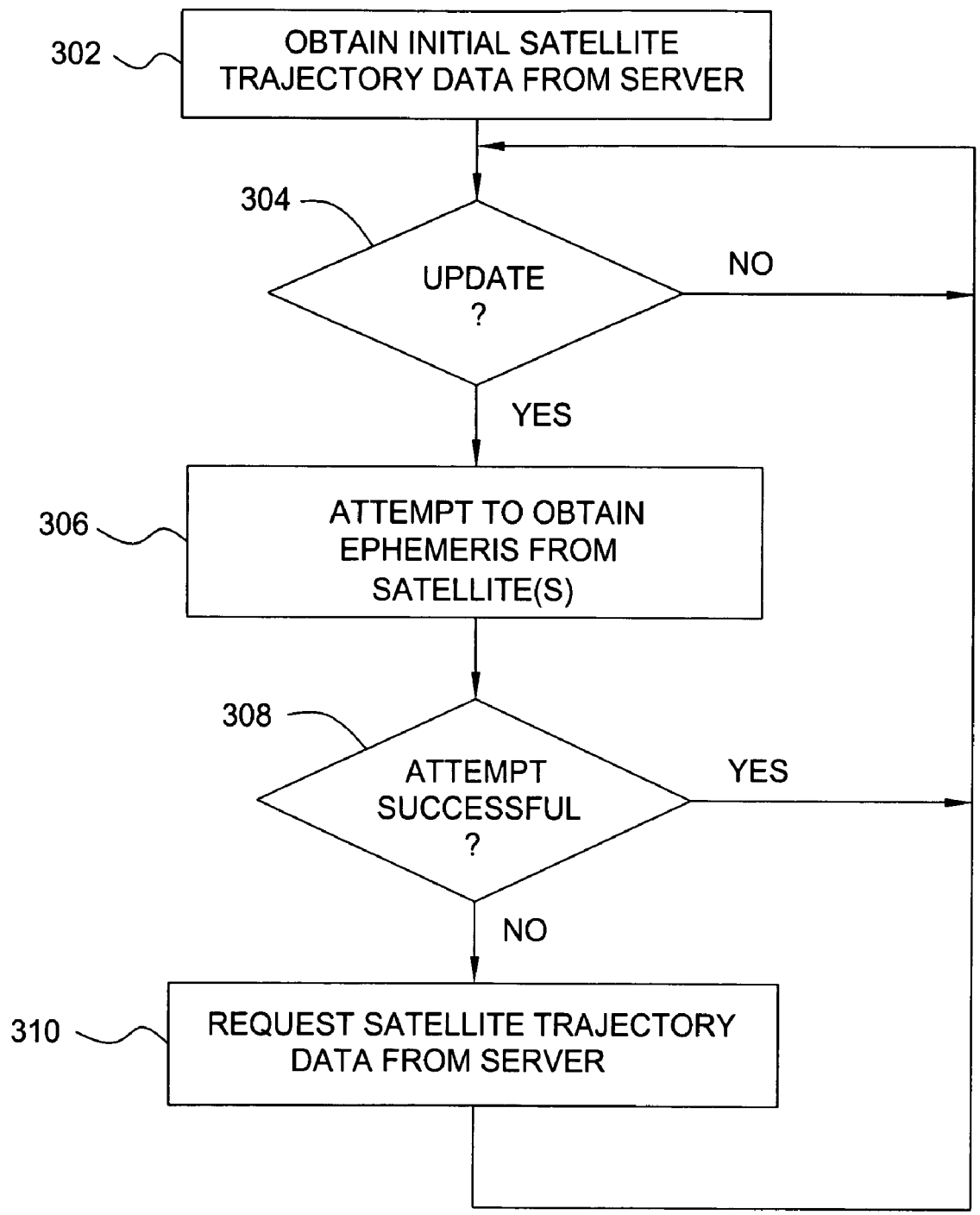
FIG. 3 is a flow diagram depicting another exemplary embodiment of a method for obtaining satellite trajectory data at a mobile receiver in accordance with the invention.

FIG. 3 is a flow diagram depicting another exemplary embodiment of a method 300 for obtaining satellite trajectory data at a mobile receiver in accordance with the invention. Aspects of the method 300 may be understood with reference to FIG. 1. The method 300 begins at step 302, where the mobile receiver 102 initially obtains satellite trajectory data from the server 108 (e.g., the mobile receiver 102 is configured to operate in a MS based mode). The mobile receiver 102 may use the initial satellite trajectory data along with satellite measurement data to compute position.

At step 304, a determination is made as to whether the satellite trajectory data should be updated. The satellite trajectory data may be updated upon occurrence of various conditions, such as those described above with respect to the method 200 of FIG. 2. Notably, new the mobile receiver 102 may be in view of new satellites not accounted for in the initial satellite trajectory data. For example, the mobile receiver 102 may detect new satellites using Almanac data. As is well known in the art, the Almanac provides coarse satellite trajectory data that is valid for two months. The mobile receiver 102 may use the Almanac as a basis for deciding which satellites are currently in view. If one or more satellites are currently in-view for which there is no satellite trajectory data, the mobile receiver 102 attempts to obtain ephemeris directly from such new satellites. In another embodiment of the invention, the may detect the presence of the PN codes for new satellites. That is, if the GPS receiver 104 detects PN codes of satellites for which there is no satellite trajectory data, the mobile receiver 102 may attempt to obtain ephemeris data directly from such new satellites.

If no update is necessary, the step 304 is repeated. Otherwise, the method 300 proceeds to step 306. At step 306, the mobile receiver 102 attempts to obtain ephemeris data from one or more satellites to update the initial satellite trajectory data (e.g., obtain ephemeris for the newly detected satellites). At step 308, a determination is made as to whether ephemeris has been obtained from the satellite(s). If so, the method 300 returns to step 304. If not, the method 300 proceeds to step 310. Notably, the mobile receiver may attempt to obtain ephemeris from the satellite(s) for a predefined period of time. If ephemeris has not been obtained from the satellites after the time period elapses, the method proceeds to step 310.

At step 310, the mobile receiver 102 requests satellite trajectory data from the server 108. The mobile receiver 102 may request data from the server 108 for only the new satellites, or may request a completely updated set of satellite trajectory data for all currently in-view satellites. The method 300 then returns to step 304. The mobile receiver 102 thus minimizes communication with the server 108 (e.g., minimizes air-time usage) by first attempting to update the initial satellite trajectory data using ephemeris directly from the satellites before getting such an update from the server.

Figure 4:
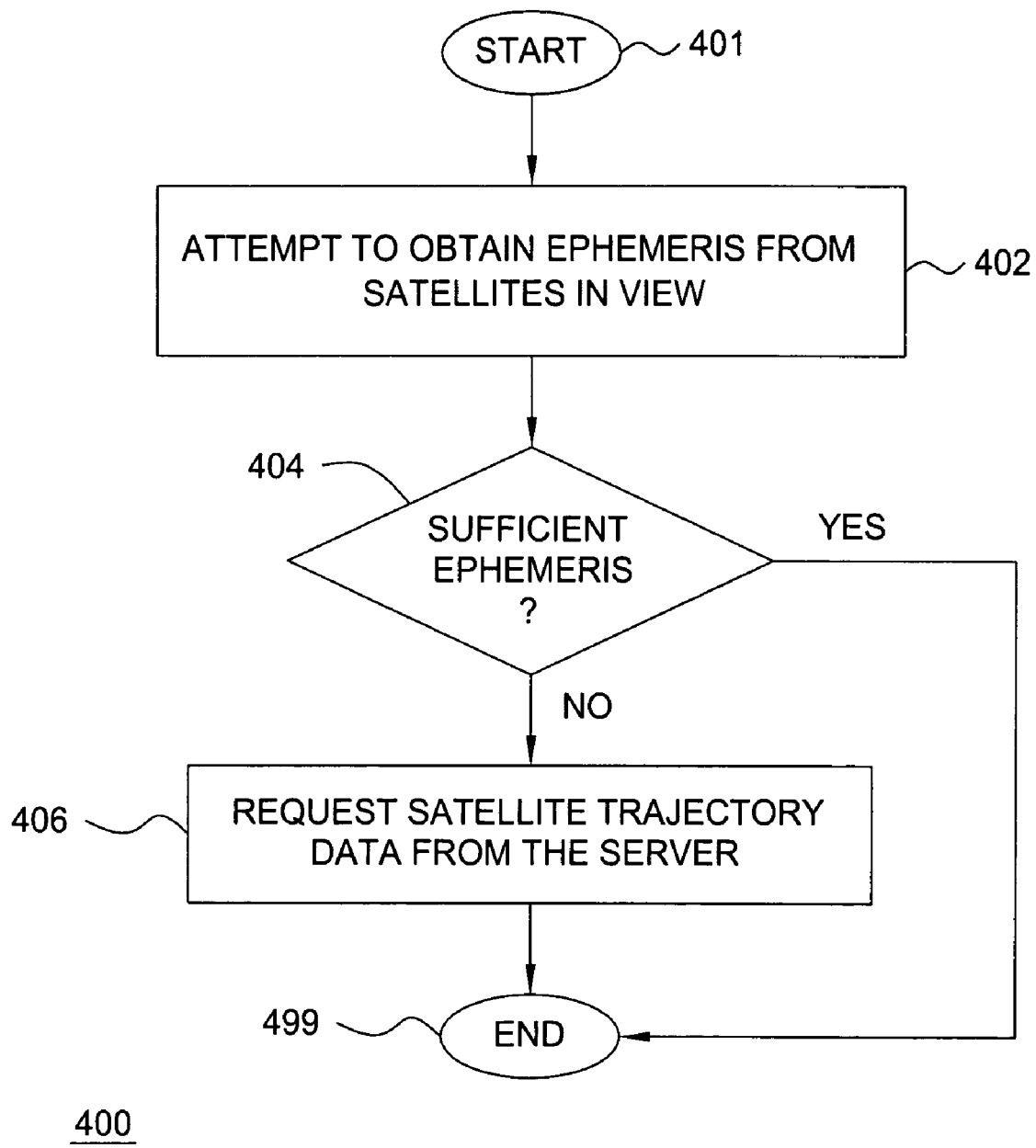
FIG. 4 is a flow diagram depicting yet another exemplary embodiment of a method for obtaining satellite trajectory data at a mobile receiver in accordance with the invention.

FIG. 4 is a flow diagram depicting yet another exemplary embodiment of a method 400 for obtaining satellite trajectory data at a mobile receiver in accordance with the invention. Aspects of the method 400 may be understood with reference to FIG. 1. The method 400 begins at step 401. At step 402, the mobile receiver 102 attempts to obtain ephemeris data from satellites in view of the mobile receiver 102. At step 404, a determination is made as to whether sufficient ephemeris has been obtained to compute position of the mobile receiver 102. In one embodiment, the mobile receiver 102 has "sufficient" ephemeris data if ephemeris has been obtained from each satellite for which measurements are being used in a position calculation. For example, the mobile receiver 102 may use measurements from four in-view satellites and thus would require ephemeris from those four satellites. As understood by those skilled in the art, the mobile receiver 102 may generally require measurements to one or more satellites, depending on the number of position and time variables that need to be computed. Notably, some of the variables (e.g., x, y, z position variables and common-mode bias and time-of-day variables) may be known or fixed a-priori (e.g., the z or altitude position variable may be fixed using a terrain model).

If, at step 404, sufficient ephemeris has been obtained, the method 400 ends at step 499. Otherwise, the method 400 proceeds to step 406. At step 406, the mobile receiver 102 requests satellite trajectory data from the server 108. In one embodiment, the mobile receiver 102 only requests satellite trajectory data for the in-view satellites for which such information is missing. In this manner, communication time between the mobile receiver 102 and the server 108 is reduced. The method 400 ends at step 499.

Figure 5:
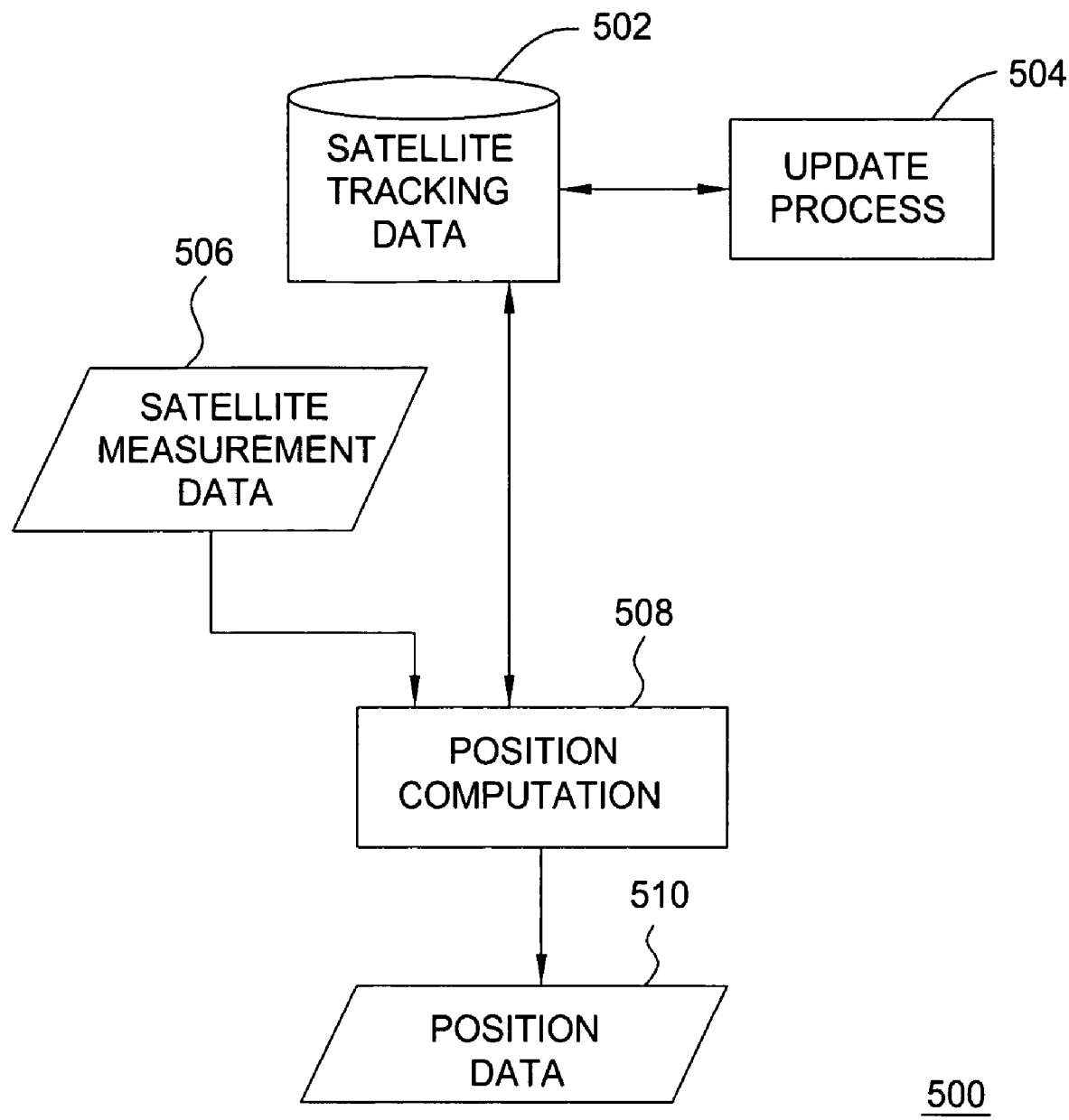
FIG. 5 is a data flow diagram depicting an exemplary embodiment of a method for computing position of a mobile receiver in accordance with the invention.

FIG. 5 is a data flow diagram depicting an exemplary embodiment of a method 500 for computing position of a mobile receiver in accordance with the invention. Aspects of the method 500 may be understood with reference to FIG. 1. Satellite measurement data 506 and satellite tracking data 502 are input to a position computation process 508 to produce position data 510. The position computation process 508 implements a conventional navigation solution. The satellite tracking data 502 is updated via the update process 504. In one embodiment, the satellite tracking data is initially obtained from the server 108 and the update process 504 is implemented using the method 200 or the method 300 described above with respect to FIGS. 2 and 3, respectively. In another embodiment, the satellite tracking data is obtained and updated using the method 400 described above with respect to FIG. 4.

In the preceding discussion, the invention has been described with reference to application upon the United States Global Positioning System (GPS). It should be evident, however, that these methods are equally applicable to similar satellite systems, and in particular, the Russian GLONASS system, the European GALILEO system, combinations of these systems with one another, and combinations of these systems and other satellites providing similar signals, such as the wide area augmentation system (WMS) and SBAS that provide GPS-like signals. The term "GPS" used herein includes such alternative satellite positioning systems, including the Russian GLONASS system, the European GALILEO system, the WAAS system, and the SBAS system, as well as combinations thereof.

While the foregoing is directed to embodiments of the present invention, other and further embodiments of the invention may be devised without departing from the basic scope thereof, and the scope thereof is determined by the claims that follow.

What is claimed is:

1. A method of locating position of a mobile receiver, comprising:
   obtaining satellite measurements at said mobile receiver for a plurality of satellites in a satellite positioning system constellation;
   obtaining satellite trajectory data at said mobile receiver from a server;
   obtaining ephemeris data at said mobile receiver from at least one satellite of said plurality of satellites; and
   computing position of said mobile receiver using said satellite measurements, said satellite trajectory data, and said ephemeris data.

2. The method of claim 1, wherein said satellite trajectory data is obtained from said server at a first time, and wherein the method further comprises:
   detecting connectivity between said mobile receiver and said server at a second time;
   wherein said ephemeris data is obtained from said at least one satellite in response to absence of said connectivity at said second time.

3. The method of claim 1, wherein said satellite trajectory data is obtained from said server at a first time and said ephemeris data is obtained from said at least one satellite at a second time, and wherein the method further comprises:
   determining whether a combination of said satellite trajectory data and said ephemeris data includes data for each of said plurality of satellites; and
   obtaining additional satellite trajectory data at said mobile receiver from said server in response to said combination ephemeris data not including data for each of said plurality of satellites.

4. The method of claim 1, wherein said satellite trajectory data is obtained from said server at a first time and said ephemeris data is obtained from said at least one satellite at a second time, and wherein the method further comprises:
   processing a combination of said satellite trajectory data and said ephemeris data to identify missing data for said plurality of satellites; and
   obtaining said missing data at said mobile receiver from said server.

5. The method of claim 1, wherein said satellite trajectory data comprises ephemeris.

6. The method of claim 1, wherein said satellite trajectory data is associated with a set of satellites in said satellite positioning system constellation exclusive of said at least one satellite.

7. The method of claim 6, wherein said satellite trajectory data is obtained at a first time and said ephemeris data is obtained at a second time, and wherein said at least one satellite is not in view of said mobile receiver at said first time.

8. The method of claim 1, wherein said step of obtaining said ephemeris data comprises:
   detecting at least one satellite signal broadcast by said at least one satellite; and
   decoding said at least one satellite signal to obtain said ephemeris data.

9. A mobile receiver, comprising:
   a wireless transceiver for obtaining, at said mobile receiver, satellite trajectory data from a server;
   a satellite signal receiver for obtaining, at said mobile receiver, satellite measurements for a plurality of satellites in a satellite positioning system constellation and obtaining, at said mobile receiver, ephemeris data from at least one satellite of said plurality of satellites; and a processor for computing position of said mobile receiver using said satellite measurements, said satellite trajectory data, and said ephemeris data.

10. The mobile receiver of claim 9, further comprising:
means for detecting connectivity between said mobile receiver and said server;
wherein said satellite signal receiver is configured to obtain said ephemeris data from said at least one satellite in response to absence of said connectivity at said second time.

11. The mobile receiver of claim 9, further comprising:
means for determining whether a combination of said satellite trajectory data and said ephemeris data includes data for each of said plurality of satellites;
wherein said wireless transceiver is configured to obtain additional satellite trajectory data from said server in response to said combination ephemeris data not including data for each of said plurality of satellites.

12. The mobile receiver of claim 9, wherein said processor is configured to process a combination of said satellite trajectory data and said ephemeris data to identify missing data for said plurality of satellites, and wherein said wireless transceiver is configured to obtain said missing data from said server.

13. The mobile receiver of claim 9, wherein said satellite trajectory data comprises ephemeris.

14. The mobile receiver of claim 9, wherein said satellite trajectory data is associated with a set of satellites in said satellite positioning system constellation exclusive of said at least one satellite.

15. The mobile receiver of claim 9, wherein said satellite signal receiver is configured to:
detect at least one satellite signal broadcast by said at least one satellite; and
decode said at least one satellite signal to obtain said ephemeris data.

16. Apparatus for locating position of a mobile receiver, comprising:
means for obtaining satellite measurements at said mobile receiver for a plurality of satellites in a satellite positioning system constellation;
means for obtaining satellite trajectory data at said mobile receiver from a server;
means for obtaining ephemeris data at said mobile receiver from at least one satellite of said plurality of satellites; and
means for computing position of said mobile receiver using said satellite measurements, said satellite trajectory data, and said ephemeris data.

17. The apparatus of claim 16, wherein said satellite trajectory data is obtained from said server at a first time, and wherein the apparatus further comprises:
means for detecting connectivity between said mobile receiver and said server at a second time;
wherein said ephemeris data is obtained from said at least one satellite in response to absence of said connectivity at said second time.

18. The apparatus of claim 16, wherein said satellite trajectory data is obtained from said server at a first time and said ephemeris data is obtained from said at least one satellite at a second time, and wherein the apparatus further comprises:
means for determining whether a combination of said satellite trajectory data and said ephemeris data includes data for each of said plurality of satellites; and
means for obtaining additional satellite trajectory data at said mobile receiver from said server in response to said combination ephemeris data not including data for each of said plurality of satellites.

19. The apparatus of claim 16, wherein said satellite trajectory data is obtained from said server at a first time and said ephemeris data is obtained from said at least one satellite at a second time, and wherein the apparatus further comprises:
means for processing a combination of said satellite trajectory data and said ephemeris data to identify missing data for said plurality of satellites; and
means for obtaining said missing data at said mobile receiver from said server.

20. The apparatus of claim 16, wherein said satellite trajectory data comprises ephemeris.

21. The apparatus of claim 16, wherein said satellite trajectory data is associated with a set of satellites in said satellite positioning system constellation exclusive of said at least one satellite.

22. The apparatus of claim 21, wherein said satellite trajectory data is obtained at a first time and said ephemeris data is obtained at a second time, and wherein said at least one satellite is not in view of said mobile receiver at said first time.

23. The apparatus of claim 16, wherein said means for obtaining said ephemeris data comprises:
means for detecting at least one satellite signal broadcast by said at least one satellite; and
means for decoding said at least one satellite signal to obtain said ephemeris data.

* * * * *